United States Patent [19]

Hall, Jr.

[11] 4,437,802

[45] Mar. 20, 1984

[54] BORING TOOL HAVING A DETACHABLE CUTTING BLADE

[76] Inventor: John J. Hall, Jr., 13 Ridgwood Rd., Wallingford, Conn. 06492

[21] Appl. No.: 302,165

[22] Filed: Sep. 14, 1981

[51] Int. Cl.³ .......................... B23B 41/02; B26D 1/12
[52] U.S. Cl. ...................................... 408/197; 407/36
[58] Field of Search .................... 407/36, 40, 44, 46, 407/92, 97, 103; 408/186, 192, 193, 194, 197, 703, 199

[56] References Cited

U.S. PATENT DOCUMENTS

| | | | |
|---|---|---|---|
| 1,145,822 | 7/1915 | Wilder | 408/703 |
| 1,216,328 | 2/1917 | Koontz | 408/197 |
| 1,310,319 | 7/1919 | Baumann et al. | 408/703 |
| 1,681,675 | 8/1928 | Miller | 407/36 |
| 1,934,465 | 11/1933 | Hillner | 407/36 |
| 2,310,992 | 2/1943 | Proksa | 408/197 |
| 3,002,405 | 10/1961 | Heftler | 408/197 |
| 3,033,062 | 5/1962 | Carstedt | 408/703 |
| 3,376,763 | 4/1968 | Welles | 408/199 |
| 4,279,550 | 7/1981 | Kress | 408/197 |

FOREIGN PATENT DOCUMENTS 1084975  11/1924  United Kingdom ................. 407/36

*Primary Examiner*—E. R. Kazenske
*Assistant Examiner*—Paul M. Heyrana
*Attorney, Agent, or Firm*—St. Onge, Steward, Johnston & Reens

[57] ABSTRACT

A boring tool having a detachable cutting blade, and, more particularly a gun drill for boring holes to extremely exacting tolerances.

7 Claims, 7 Drawing Figures

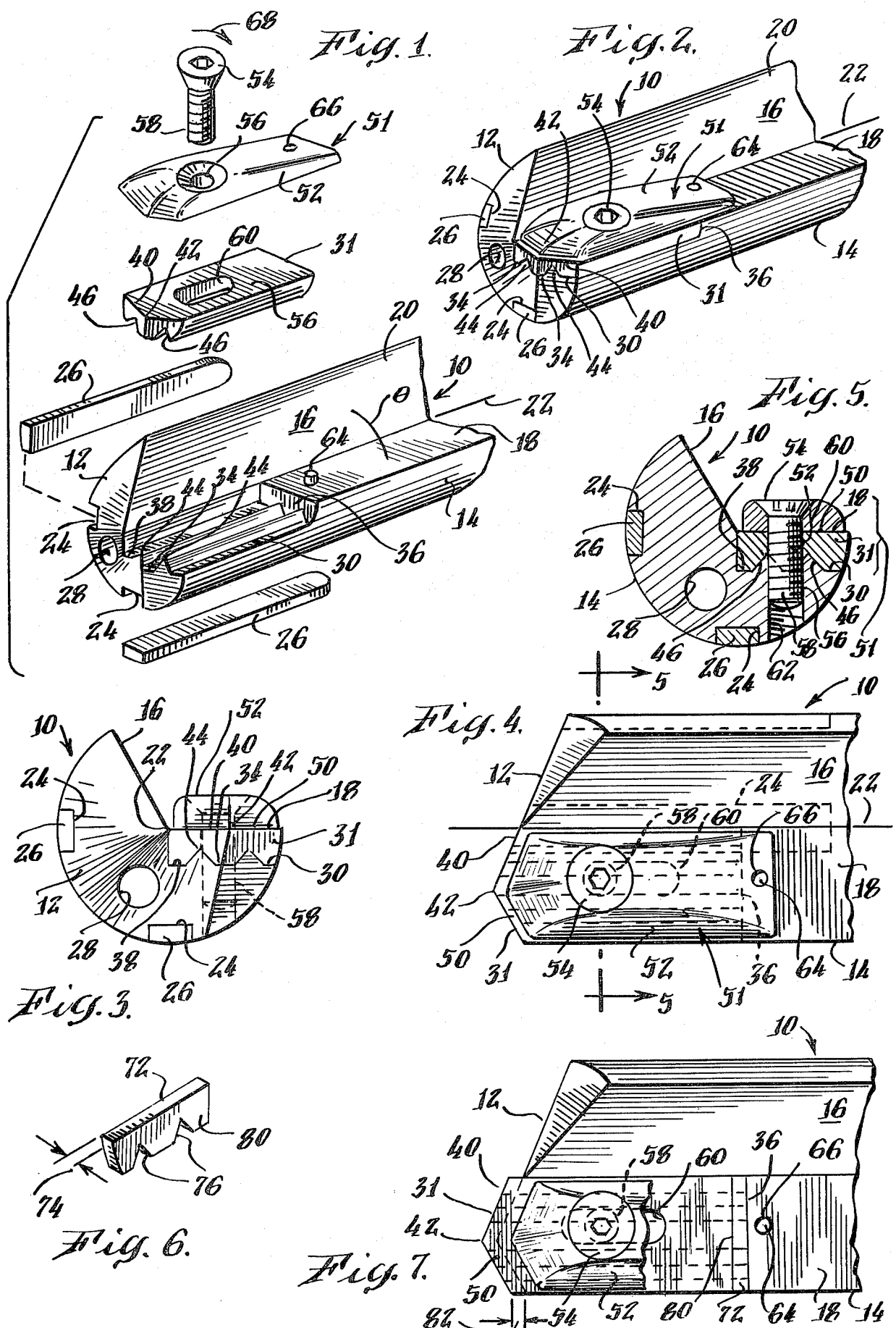

BORING TOOL HAVING A DETACHABLE CUTTING BLADE

BACKGROUND OF THE INVENTION

1. Field of the Invention

The present invention relates to a boring tool having a detachable cutting blade, and, more particularly the present invention relates to a gun drill for boring holes to extremely exacting tolerances.

2. Description of the Prior Art

A conventional gun drill comprises an elongate shank having a cylindrical cutting head on the end thereof. The head has a front end and a cylindrically shaped outer surface and includes a V-shaped groove for removing chips extending longitudinally rearwardly from the front of the head and is open radially to the outer surface thereof. The cutting head of the gun drill has a cutting blade brazed into a recess in one of the surfaces of the V-shaped groove. The cutting blade is made of carbide or some other hard material which is suitable for cutting steel. An example of a gun drill having a cutting head of the type described above is disclosed in U.S. Pat. No. 3,153,356.

In the manufacture of a conventional gun drill, the carbide cutting blade is brazed into a recess in a surface of the V-shaped chip groove. During brazing, the blade is heated to an elevated temperature and then cooled, which is believed to result in deterioration of the useful life of the blade, that is, the blade material softens and the blade dulls more quickly during use. Further, as the drill is used, the cutting blade becomes worn and requires resharpening. After the cutting blade is sharpened several times, it becomes worn to the point wherein the entire gun drill must be discarded or returned to the manufacturer for retipping with a new cutting head. Other boring tools having a detachable cutting blade or a detachable tip are disclosed in the following patents:

| U.S. Pat. No. | Inventor |
|---|---|
| 339,544 | S. P. Graham |
| 492,733 | H. Meister |
| 752,863 | O. P. Roberge |
| 923,257 | O. Fredrickson |
| 1,929,801 | F. E. Berry |
| 2,310,992 | J. R. Proksa |
| 2,451,922 | A. J. Cox |
| 3,135,522 | W. Bellz |
| 3,289,273 | G. P. Artaud |
| 3,304,816 | L. C. Galorneau |
| 3,618,962 | J. R. Cox et al |
| 3,859,700 | Richard R. Jilbert |
| 4,060,335 | Holloway et al |
| 4,146,240 | Mogens B. Nielsen |
| 4,232,985 | Mogens B. Nielsen |
| French Pat. No. 1,274,017 | M. Kleine |

It is an object of the present invention to provide a boring tool, also referred to as a gun drill, having a detachable cutting blade. More particularly, it is an object of the present invention to provide a cutting blade that may be removed from the head of the boring tool, sharpened and then replaced, or replaced with another blade. It is a further object of the present invention to provide a blade that is capable of being moved forwardly so that the blade may be repeatedly sharpened and then advanced thereby extending its useful life.

SUMMARY OF THE INVENTION

The boring tool in accordance with the present invention includes a detachable cutting blade which may be removed, sharpened and then replaced or replaced with another blade. The term "boring tool" as used herein means a tool capable of forming an elongate cylindrical hole in a solid or enlonging, or boring out, an existing hole, and is meant to include all gun drills. A boring tool in accordance with the invention includes a shank having a cylindrical head. The head includes a front end and a cylindrically shaped outer surface. A groove for removing chips extends longitudinally rearwardly from the front end and is open radially to the outer surface of the head. The groove includes a recess for receiving a detachable cutting blade. The recess has a floor extending longitudinally rearwardly from the front end to a stop surface at the rear thereof. The stop surface prevents rearward movement of the blade when it is positioned in the recess. The blade includes an interior surface which seats on the recess floor so that the cutting edge of the blade protrudes from the front end of the shank to enable the boring tool to cut a hole.

The interior surface of the blade and the recess floor includes a mechanism for retaining a seated blade against radial outward movement. In a preferred form of the invention, the mechanism for retaining the blade comprises at least one elongate protrusion extending longitudinally along at least a portion of the recess floor and the interior surface of the blade includes an elongate slot for receiving the protrusion. The protrusion is moveable longitudinally in the slot to provide for advancement of the cutting blade thereby enabling the blade to be removed from the recess, sharpened and then replaced in a position advanced with respect to its position prior to sharpening. In order to prevent the blade from moving rearwardly after it has been advanced, a shim may be placed in the recess adjacent the stop surface to account for the portion of the blade worn off during sharpening.

The boring tool includes a mechanism for releasably securing the blade against transverse movement out of the recess. In accordance with a preferred aspect of the invention, the securing mechanism comprises a plate positioned adjacent the blade outer surface, the plate being held in place by a releasable fastner such as a screw fastner. The plate includes an aperture for alignment with an aperture in the blade, which in turn is aligned with an aperture located in the floor of the recess. The screw fastner holds the plate adjacent to the blade and has its end portion threaded to engage threads in the aperture in the recess floor.

A boring tool in accordance with the present invention is particularly advantageous in that the blade is detachable to provide for sharpening and then replacement of the sharpened blade or removal of the blade and replacement with another blade. The boring tool of the present invention avoids the time consuming task of brazing the cutting blade into the recess and thereby avoids blade deterioration due to heating and cooling. Additional advantages of a boring tool in accordance with the present invention will be apparent from the following detailed description of the invention with reference to the drawings.

BRIEF DESCRIPTION OF THE DRAWINGS

FIG. 1 is an exploded perspective view of the head of a boring tool in accordance with the present invention;

FIG. 2 is a view similar to that shown in FIG. 1 except that the tool has been assembled;

FIG. 3 is a front plan view of the tool shown in FIG. 2;

FIG. 4 is a top plan view of the tool shown in FIG. 2;

FIG. 5 is a sectional view along the plane 5—5 of the tool shown in FIG. 4;

FIG. 6 is a perspective view of a shim for retaining the blade in an advanced position after it has been sharpened;

FIG. 7 is a top plan view of the tool shown in FIG. 4 with the securement plate removed after the blade has been sharpened and a shim positioned in the recess behind the blade to thereby retain the blade in an advanced position.

DETAILED DESCRIPTION OF THE INVENTION

Referring to FIGS. 1 thru 4, a boring tool in accordance with the present invention comprises a cylindrical head 10 having a front end 12 and a cylindrically shaped outer surface 14. The head has been broken away from the remainder of the shank to simplify the drawings. The head includes a groove 16 for removing chips that are cut away during the boring operation. The groove 16 extends longitudinally rearwardly from the front end 12 and is open radially to outer surface 14 of the head 12. The groove preferably has a V-shape formed by two surfaces 18 and 20 which intersect at the axis 22 of the cylindrical shank. The angle of intersection between surfaces 18 and 20 is approximately 120 degrees (see FIG. 1).

As the boring tool is turned in a hole, the outer surface 14 may tend to wear. In order to prevent or reduce this wear, the head includes at least one and preferably two longitudinal slots 24 for receiving abrasion resistant pads 26, which are typically made from carbide and are brazed into the slots. An oil supply passage 28 extends the length of the shank and its head 10 to the front surface 12 and provides for supply of oil during a boring or drilling operation.

Surface 18 of the groove 16 includes a recess 30 for receiving a detachable cutting blade 31. The recess 30 has a floor 34 that extends longitudinally rearwardly from the front end 12 to a stop surface 36. Stop surface 36 prevents rearward movement of the blade 31 when it is positioned in the recess. The recess 30 also extends from the head axis 22 radially outwardly to the outer surface 14 of the head 10.

Referring in particular to FIGS. 1 and 5, the blade 31, which has a generally rectangular cross-sectional shape, includes an interior surface 38 for seating on the recess floor 34. The blade 31 also includes a cutting edge 40 which protrudes from the front end 12 of the head 10 when the blade is seated in its recess. The cutting edge 40 preferably has a sharpened point 42 that is the forwardmost point of the boring tool. The cutting edge 40, as best shown in FIG. 4, extends the complete radial distance between the tool axis 22 and the outer surface 14 of the head to thereby provide a blade sweep of a circular area as the shank is rotated.

The interior surface 38 of the blade 31 and the floor 34 of the recess include a mechanism for retaining the seated blade against radial outward movement when the shank and its head 10 are rotated. In accordance with a preferred aspect of the invention, this retaining mechanism comprises at least one and preferably two elongate protrusions 44 extending longitudinally along at least a portion of the recess floor 34. The interior surface 38 of the blade includes at least one and preferably two elongate slots 46 for receiving and mating with respect to the protrusions 44. The elongate protrusions 44 and slots 46 preferably have mating V-shapes and extend the entire length of the recess floor 34 and blade surface 38. The V-shape of the protrusions 44 and the slots 46 are given by way of example only and are preferred because it is a simple machining operation to cut one or more V-shaped slots in a hard carbide surface. However, it should be understood that the slots and protrusions may have a semi-cylindrical, rectangular cross-sectional or other shapes. As will be described hereinafter with respect to FIGS. 6 and 7, the slots and the protrusions enable the blade 31 to be advanced forwardly after it is sharpened.

Referring in particular to FIGS. 1 and 5 as well as the other figures, a mechanism 51 for releasably securing the blade against transverse movement out of the recess 30 will now be described in detail. The securing mechanism comprises a plate 52 for positioning adjacent to the outer surface 50 of the blade 31. The plate 52 is held in place by a releasable screw fastner 54 and includes an aperture 56 for receiving the shaft 58 of screw fastner 54. The blade 31 includes an aperture 60 sized to receive the shaft 58 of screw fastner 54. A threaded aperture 62 in the recess floor 34 is provided for receiving the threaded shaft 58 of screw fastner 54. As shown in FIGS. 1, 2 and 5, the blade 31 is positioned in recess 30 and the apertures 56, 60 and 62 are aligned to receive screw fastner 54.

The rear end portion 53 of the plate 52 includes a mechanism for retaining the plate 52 against longitudinal and radial movement with respect to the groove surface 18 when the fastner 54 is tightened by rotating it. The plate retaining means comprises a pin 64 extending from groove surface 18 for being journaled in a bearing hole 66 in the securement plate 52 (see FIG. 1). When the screw fastner 54 is turned in a clockwise direction as shown by arrow 68 (FIGS. 1 & 2) the rear end portion 53 of plate 52 would normally swing in the direction shown by arrow 70 in FIG. 2. The interlocking pin and bearing hole prevent movement of the plate 52 in the direction shown by arrow 70.

The manner by which the blade may be removed, sharpened and then replaced will now be described. Referring in particular to FIGS. 1, 6 and 7, when the blade 31 becomes dull after a period of use, screw fastner 54 is unscrewed and the plate 31 is either lifted upwardly as shown in FIG. 1 wherein pin 64 disengages from bearing hole 66 or, alternatively, the plate 31 can be pivoted about pin 64 to a position so that the blade may be removed from the recess 30. When the blade 31 is sharpened, part of the front portion of the blade 31 is ground away and the length of the blade is shortened. To account for this shortening of the blade during sharpening, one or more shims such as that shown in FIG. 6 may be provided. Shim 72 as shown in FIG. 6 has a width 74 that accounts for the portion of the blade ground away during sharpening. It should be understood that the thickness of the shim shown in FIGS. 6 and 7 is slightly exaggerated to better illustrate its function. As shown in FIG. 6 the shim may include a pair of slots 76 which are sized to seat on protrusions 44. It should be understood that slots 76 are optional and that the shim may simply be a thin sheet of noncompressible material such as sheet metal. Referring to FIG. 7, the shim 72 has been positioned in the recess adjacent stop surface 76 so that the front surface 80 of the shim becomes the new stop surface. As shown in FIGS. 1 and 7 the aperture 60 of blade 31 is elongated to enable the blade to be advanced but to still be secured in the recess by the screw fastener 54. After the blade has been positioned in its recess, the securement plate 52 is fastened in place and the boring tool is ready once again for use. As shown in FIG. 7, the blade 31 has been advanced a distance as shown by reference character 82. The end portion of the blade shown in phantom has been ground away during sharpening so that the ground cutting edge 40 is in the proper position with respect to the front surface 12 of the tool.

As can well be appreciated, the boring tool of the present invention enables the cutting blade 31 to be removed and periodically sharpened thereby prolonging the useful life of the boring tool. Furthermore, use of a detachable blade avoids brazing of the carbide blade which would ordinarily degrade its hardness properties thereby decreasing its useful life. Furthermore, once the blade has been sharpened several times and is no longer useful, the blade may be removed and replaced with a new carbide blade thereby minimizing the down time of the tool. Furthermore, the blade change may occur while the boring tool is in its turning socket thereby minimizing the downtime required when a conventional boring tool becomes dull and removal of the entire tool is necessary.

It should be understood that although specific embodiments of the invention have been described herein in detail, such description is for purposes of illustration only and modifications may be made thereto by those skilled in the art within the scope of the invention.

What is claimed is:

1. A boring tool comprising:
   a cylindrical head having a front end and a cylindrically shaped outer surface, said head including a groove for removing chips extending longitudinally rearwardly from said front end and being open radially to said outer surface, said groove including a planar surface having a recess therein for receiving a detachable cutting blade, said recess having a floor extending longitudinally rearwardly from said front end to a stop surface at the rear thereof for preventing rearward movement of said blade, said recess extending radially outwardly to the outer surface of said head, said blade having an interior surface for seating on said recess floor and having a cutting edge protruding from the front end of said bead, said interior blade surface and said floor including at least one mating protrusion and slot extending longitudinally for permitting longitudinal advancement of said blade surface with respect to said floor and for retaining said seated blade against radial outward movement, and including a plate for releasably securing said blade against transverse movement out of said recess, said blade including an outer surface that is substantially flush with said groove surface, said plate being positioned in overlying relationship adjacent said blade outer surface and said groove surface, said plate being held in place by releasable fastening means.

2. A boring tool according to claim 1 wherein said elongate protrustion and slot have mating V-shapes and extend the length of said recess floor.

3. A boring tool according to claim 2 and further including a shim for placement in said recess adjacent said stop surface to prevent rearward movement of said advanced blade.

4. A boring tool according to claim 3 further including an aperture in said blade for receiving said fastening means, said fastening means extending transversely from said plate through said aperture and being releasably secured in an aperture in said head.

5. A boring tool according to claim 4 wherein said blade aperture is elongated to provide for advancement of said blade with respect to said fastening means.

6. A boring tool according to claim 5 wherein said plate includes an aperture for alignment with said blade aperture and said head aperture, said fastening means comprising a screw fastener having threads for engagement with threads in said head aperture, said plate further including a rear end portion adjacent said groove surface, said rear end portion including means for retaining said plate against longitudinal and radial movement with respect to said groove surface.

7. A boring tool according to claim 6 wherein said plate retaining means comprises a pin extending from said groove surface journaled in a bearing hole in said securement plate.

* * * * *